United States Patent
Ochi et al.

(10) Patent No.: US 10,669,167 B2
(45) Date of Patent: Jun. 2, 2020

(54) WATER TREATMENT DEVICE AND WATER TREATMENT METHOD

(71) Applicants: NIKKISO CO., LTD., Tokyo (JP); METAWATER Co., Ltd., Tokyo (JP); SENKO RIKEN Co., Ltd., Kobe-shi, Hyogo (JP)

(72) Inventors: Tetsumi Ochi, Tokyo (JP); Shinya Watanabe, Hakusan (JP); Junichi Shiga, Tokyo (JP); Tsukasa Kusano, Tokyo (JP); Eiichi Tsuga, Kobe (JP); Yusuke Kawakami, Kobe (JP)

(73) Assignees: NIKKISO CO., LTD., Tokyo (JP); METAWATER CO., LTD., Tokyo (JP); SENKO RIKEN CO., LTD., Kobe-Shi, Hyogo (JP)

(*) Notice: Subject to any disclaimer, the term of this patent is extended or adjusted under 35 U.S.C. 154(b) by 0 days.

(21) Appl. No.: 16/399,070

(22) Filed: Apr. 30, 2019

(65) Prior Publication Data
US 2019/0256380 A1 Aug. 22, 2019

Related U.S. Application Data

(63) Continuation of application No. PCT/JP2017/036922, filed on Oct. 12, 2017.

(30) Foreign Application Priority Data

Oct. 31, 2016 (JP) ................. 2016-212761

(51) Int. Cl.
C02F 1/32 (2006.01)

(52) U.S. Cl.
CPC .............. *C02F 1/325* (2013.01); *C02F 1/32* (2013.01); *C02F 2201/004* (2013.01);
(Continued)

(58) Field of Classification Search
CPC combination set(s) only.
See application file for complete search history.

(56) References Cited

U.S. PATENT DOCUMENTS

| 2004/0222163 A1 | 11/2004 | Saccomanno |
| 2006/0131246 A1 | 6/2006 | Ehlers |

(Continued)

FOREIGN PATENT DOCUMENTS

| JP | S53539 A | 1/1978 |
| JP | 2003109186 A | 4/2003 |

(Continued)

OTHER PUBLICATIONS

Method and Apparatus for Liquid Disinfection by Light Emitted From Light Emitting Diodes JP 2016-5141138 translation Rozenberg (Year: 2016).*

(Continued)

*Primary Examiner* — Cameron J Allen
(74) *Attorney, Agent, or Firm* — Muncy, Geissler, Olds & Lowe, P.C.

(57) ABSTRACT

A water treatment device includes: a dual-pipe structure unit including an outer pipe, an inner pipe provided in the outer pipe, and a prevention member provided between the outer pipe and the inner pipe; and a light source unit radiating ultraviolet light in the axial direction to irradiate water subject to treatment flowing in the inner pipe. The inner pipe includes an opposing end facing the light source unit across a gap and an inflow end positioned opposite to the opposing end. The outer pipe includes an outflow port provided on an outer circumferential surface of the outer pipe. The water subject to treatment flowing out of the inner pipe via the gap flows out from the outflow port.

15 Claims, 1 Drawing Sheet

(52) U.S. Cl.
CPC .. *C02F 2201/3222* (2013.01); *C02F 2303/04* (2013.01); *Y02E 10/22* (2013.01)

(56) References Cited

U.S. PATENT DOCUMENTS

| | | |
|---|---|---|
| 2007/0272877 A1 | 11/2007 | Tribelsky et al. |
| 2014/0263090 A1* | 9/2014 | Yencho ............... C02F 1/325 210/748.11 |
| 2015/0060693 A1 | 3/2015 | Lee et al. |
| 2015/0314024 A1 | 11/2015 | Khan et al. |

FOREIGN PATENT DOCUMENTS

| | | | |
|---|---|---|---|
| JP | 2007502200 A | | 2/2007 |
| JP | 2008503347 A | | 2/2008 |
| JP | 2012115715 A | * | 6/2012 |
| JP | 2012115715 A | | 6/2012 |
| JP | 2014233646 A | | 12/2014 |
| JP | 2016511138 A | | 4/2016 |
| WO | WO2014/187523 A1 | | 11/2014 |

OTHER PUBLICATIONS

Ultraviolet Irradiation Water Treatment Apparatus, JP2012115715 (A)—Jun. 21, 2012, Inventor(s): Matsumoto Kimihisa (Year: 2012).*
A Written Opinion of the ISA issued in corresponding PCT/JP2017/036922 is attached.
A Written Opinion of the IPEA issued in corresponding PCT/JP2017/036922 is attached.
An International Search Report issued in corresponding PCT/JP2017/036922 is attached.
An International Preliminary Report on Patentability issued in corresponding PCT/JP2017/036922 is attached.
Singapore Office Action in application No. 11201903813W dated Jan. 9, 2020; pp. 1-4.
European Search Report dated Mar. 6, 2020 in corresponding EP Application No. 17 86 5086.7.
Office Action dated Dec. 17, 2019 in JP Application No. 2016-212761.

* cited by examiner

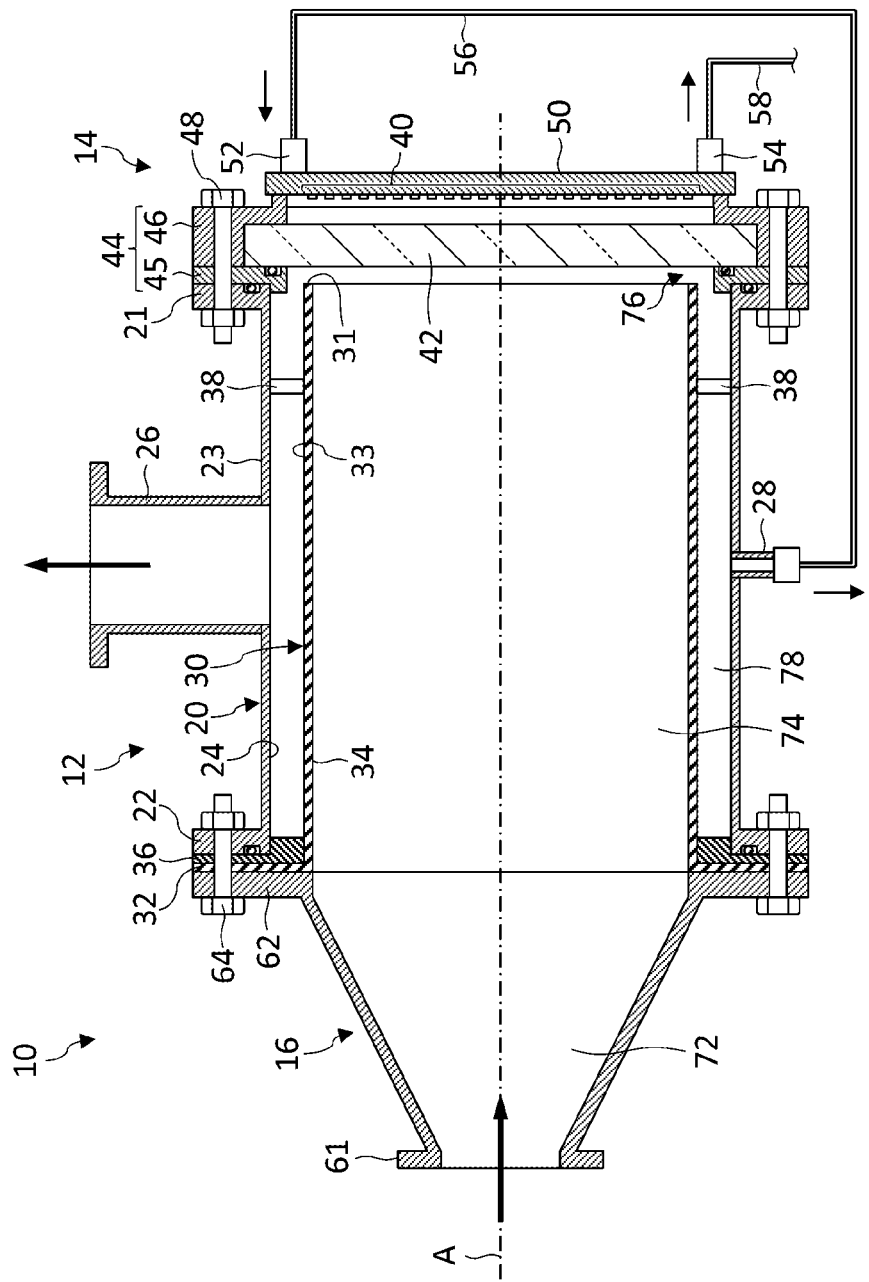

WATER TREATMENT DEVICE AND WATER TREATMENT METHOD

RELATED APPLICATION

Priority is claimed to Japanese Patent Application No. 2016-212761, filed on Oct. 31, 2016, the entire content of which is incorporated herein by reference.

BACKGROUND OF THE INVENTION

1. Field of the Invention

The present invention relates to a water treatment device, and, more particularly, a technology of irradiating water subject to treatment with ultraviolet light.

2. Description of the Related Art

It is known that ultraviolet light has sterilization capability. Devices that radiate ultraviolet light are used for sterilization in medical and food processing fronts. Devices that sterilize water subject to treatment continuously by irradiating the water subject to treatment with ultraviolet light are also used. One example is a device adapted to radiate ultraviolet light in a direction perpendicular to the direction of flow of the water subject to treatment.

In a configuration in which ultraviolet light is radiated in a direction perpendicular to the direction of flow of the water subject to treatment, it is necessary to arrange light sources along the flow direction in order to apply a sufficient action to the water subject to treatment. It has therefore been impossible to radiate ultraviolet light efficiently.

SUMMARY OF THE INVENTION

In this background, one illustrative purpose of the present invention is to provide a water treatment device in which the efficiency of ultraviolet light irradiation of water subject to treatment is enhanced.

A water treatment device according to an embodiment of the present invention includes: a dual-pipe structure unit including an outer pipe extending in an axial direction from a first end to a second end, an inner pipe provided in the outer pipe and extending in the axial direction, and a prevention member provided between the outer pipe and the inner pipe and preventing displacement of the inner pipe in a radial direction relative to the outer pipe; and a light source unit provided to block an opening of the first end of the outer pipe in a liquid-tight manner and radiating ultraviolet light in the axial direction to irradiate water subject to treatment flowing in the inner pipe. The inner pipe includes an opposing end facing the light source unit across a gap provided between the opposing end and the light source unit, and an inflow end positioned opposite to the opposing end, the water subject to treatment flowing in through the inflow end. The outer pipe includes an outflow port provided on an outer circumferential surface of the outer pipe, and the water subject to treatment flowing out of the inner pipe via the gap flows out from the outflow port.

According to the embodiment, the water subject to treatment is irradiated with ultraviolet light along the flow direction in the inner pipe so that the water subject to treatment is affected by ultraviolet light over a period of time in which the water flows in the direction of ultraviolet irradiation. In this way, ultraviolet light is radiated more efficiently than in the case of radiating ultraviolet light in a direction perpendicular to the direction of flow of the water subject to treatment. Further, by configuring the flow passage to have a dual-pipe structure to cause the water subject to treatment to flow out of the inner pipe via the gap between the inner pipe and the light source unit, the flow of the water subject to treatment in the inner pipe is straightened. This ensures that the water subject to treatment as a whole is uniformly affected by ultraviolet light and enhances the effect of water treatment. Further, by providing the prevention member that prevents the radial displacement of the inner pipe relative to the outer pipe, the flow passage width between the outer pipe and the inner pipe is maintained constant, and the flow of the water subject to treatment is straightened, even when the dual-pipe structure elongated in the axial direction is employed.

The prevention member may include an inlaid flange provided to block a space between the second end of the outer pipe and the inflow end of the inner pipe.

The prevention member may include a lock pin extending in a radial direction from an inner circumferential surface of the outer pipe toward an outer circumferential surface of the inner pipe at a position closer to the first end than the second end.

A dimension of the gap in the axial direction may be not less than 3 mm and not more than 30 mm.

A difference between an inner diameter of the outer pipe and an outer diameter of the inner pipe may be not less than 10 mm and not more than 50 mm.

The outflow port may be provided at a position closer to the second end than the first end.

The light source unit may include a light emitting device for emitting ultraviolet light and a water-cooled mechanism for cooling the light emitting device, and the water-cooled mechanism may be configured to be supplied with cooling water from a water intake port provided on the outer circumferential surface of the outer pipe, and the water intake port may be provided at a position radially opposite to the outflow port, sandwiching the inner pipe.

Another embodiment of the present invention relates to a water treatment method that uses the water treatment device. The method includes: irradiating the water subject to treatment flowing in from the inflow end and flowing in the inner pipe in the axial direction with ultraviolet light and causing the water subject to treatment irradiated with ultraviolet light to flow out from the outflow port, wherein the water subject to treatment is supplied such that a pressure loss occurring when the water passes through the water treatment device is not less than 5 kPa and not more than 20 kPa.

According to the embodiment, the flow of the water subject to treatment in the inner pipe is straightened by ensuing that the pressure loss is not less than 5 kPa and not more than 20 kPa. This ensures that the water subject to treatment as a whole is uniformly affected by ultraviolet light and enhances the effect of water treatment.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

The FIGURE schematically shows a configuration of a water treatment device according to the embodiment.

DETAILED DESCRIPTION OF THE INVENTION

The invention will now be described by reference to the preferred embodiments. This does not intend to limit the scope of the present invention, but to exemplify the invention.

A detailed description will be given of embodiments of the present invention with reference to the drawings. Like numerals are used in the description to denote like elements and a duplicate description is omitted as appropriate.

The FIGURE schematically shows a configuration of a water treatment device 10 according to the embodiment. The water treatment device 10 includes a dual-pipe structure unit 12, a light source unit 14, and an introduction pipe 16. The dual-pipe structure unit 12 includes an outer pipe 20 and an inner pipe 30. The water treatment device 10 is a device for irradiating water subject to treatment flowing in the inner pipe 30 with ultraviolet light to sterilize the water.

In this specification, the longitudinal direction of the outer pipe 20 and the inner pipe 30 may be referred to as "axial direction" to facilitate understanding. For example, referring to The FIGURE, the direction parallel to the central axis A is the axial direction. The direction perpendicular to the axial direction may be referred to as the radial direction, and the direction encircling the axial direction may be referred to as the circumferential direction.

The outer pipe 20 has a cylindrical shape and extends from a first end 21 to a second end 22 in the axial direction. The first end 21 and the second end 22 are provided with a flange that extends radially outward from an outer circumferential surface 23 of the outer pipe 20. The outer pipe 20 is made of a resin material or a metallic material. For example, the outer pipe 20 is made of stainless steel. In one example, the axial length of the outer pipe 20 is about 400 mm, and the diameter of an inner circumferential surface 24 of the outer pipe 20 is about 400 mm.

The outer circumferential surface 23 of the outer pipe 20 is provided with an outflow port 26 and a water intake port 28. The outflow port 26 is provided at a position between the first end 221 and the second end 222. The water intake port 28 is provided at a position radially opposite to the outflow port 26, sandwiching the inner pipe 30. For example, the outflow port 26 is provided on the upper side in the vertical direction, and the water intake port 28 is provided on the lower side in the vertical direction, when the water treatment device 10 is installed for operation. From the perspective of ensuring uniform pressure loss, it is preferred that the outflow port 26 and the water intake port 28 be provided at the center between the first end 21 and the second end 22 or at a position closer to the second end 22 than the center. In the case of a flow passage structure in which the uniformity of pressure loss is not affected much if the positions of the outflow port 26 and the water intake port 28 are changed, the outflow port 26 and the water intake port 28 may be provided at positions closer to the first end 21 than the second end 22.

The inner pipe 30 has a cylindrical shape and extends from an opposing end 31 to an inflow end 32 in the axial direction. The inner pipe 30 is provided in the outer pipe 20 and is preferably coaxial with the outer pipe 20. The inner pipe 30 is made of a material having a high reflectivity and durability for ultraviolet light. For example, the inner pipe 30 is made of a fluororesin material such as polytetrafluoroethylene (PTFE). In one example, the axial length of the inner pipe 30 is about 400 mm, and the diameter of the inner circumferential surface 34 of the inner pipe 30 is about 350 mm.

The inflow end 32 is provided with a flange that extends radially outward from an outer circumferential surface 33 of the inner pipe 30. On the other hand, the opposing end 31 is not provided with a flange. The opposing end 31 faces a window member 42 of the light source unit 14, sandwiching a gap 76 provided between the opposing end 31 and the window member 42. In other words, the opposing end 31 and the window member 42 are axially distanced by a dimension defined by the gap 76. The gap 76 is provided over the entire circumference of the opposing end 31 and is provided so that the axial distance between the opposing end 31 and the window member 42 (i.e., the dimension of the gap 76) is uniform over the entire circumference. It is preferred that the axial dimension of the gap 76 be not less than 3 mm and not more than 30 mm. In one example, the dimension is about 10 mm.

The dual-pipe structure unit 12 further includes an inlaid flange 36. The inlaid flange 36 is a prevention member provided between the outer pipe 20 and the inner pipe 30 and prevents radial displacement of the inner pipe 30 relative to the outer pipe 20. The inlaid flange 36 is provided to block the space between the second end 22 of the outer pipe 20 and the inflow end 32 of the inner pipe 30 and is fixed by being sandwiched between the flange of the second end 22 and the flange of the inflow end 32. An O ring is provided between the flange of the second end 22 and the inlaid flange 36. In the illustrated example, the inner pipe 30 and the inlaid flange 36 are formed as separate components. In one variation, the inner pipe 30 and the inlaid flange 36 may be integrated. For example, a step in contact with the inner circumferential surface 24 of the outer pipe 20 may be formed at the inflow end 32 of the inner pipe 30.

The dual-pipe structure unit 12 further includes a lock pin 38. The lock pin 38 is a prevention member provided between the outer pipe 20 and the inner pipe 30 and prevents the radial displacement of the inner pipe 30 relative to the outer pipe 20. The lock pin 38 is a member radially extending from the inner circumferential surface 24 of the outer pipe 20 toward the outer circumferential surface 33 of the inner pipe 30. The lock pin 38 is provided at a plurality of different locations in the circumferential direction. For example, the lock pins 38 are provided at equal intervals in the circumferential direction. It is preferred that the lock pin 38 be provided at a position closer to the first end 21 than the second end 22. By proving the lock pin 38 at a position relatively close to the first end 21, the radial displacement of the opposing end 31 of the inner pipe 30 is suitably prevented.

In one variation, only one of the inlaid flange 36 and the lock pin 38 may be provided. Still alternatively, neither the inlaid flange 36 nor the lock pin 38 may be provided. In the latter case, a prevention member of a structure different from those of the inlaid flange 36 and the lock pin 38 may be provided.

The light source unit 14 includes a plurality of light emitting devices 40, a window member 42, and a water-cooled mechanism 50. The light source unit 14 is provided at the first end 21 of the outer pipe 20 and is provided to block the opening of the first end 21 in a liquid-tight manner. The light source unit 14 radiates ultraviolet light from the opposing end 31 toward the inflow end 32 in the axial direction to irradiate the water subject to treatment flowing in the inner pipe 30.

The light emitting devices 40 is a so-called ultra violet-light emitting diode (UV-LED) and outputs deep ultraviolet light having a central wavelength or a peak wavelength included in a range of about 200 nm~350 nm. It is preferred that the light emitting device 40 emit ultraviolet light near 260 nm~290 nm having a high sterilizing efficiency. Such an ultraviolet LED is exemplified by an aluminum gallium nitride (AlGaN) based LED. A plurality of light emitting devices 40 are attached to the water-cooled mechanism 50. The plurality of light emitting devices 40 are mounted on a plane perpendicular to the axial direction and are arranged in the radial direction and in the circumferential direction within the mounting plane.

The window member 42 is provided at a position between the opposing end 31 of the inner pipe 30 and the plurality of light emitting devices 40 and are provided to block the opening of the first end 21 of the outer pipe 20. The window member 42 is made of a material having a high transmittance for the ultraviolet light from the light emitting devices 40. For example, the window member 42 is made of quartz ($SiO_2$). The window member 42 has a disc shape. In one embodiment, the diameter of the window member 42 is about 420 mm, and the thickness thereof is about 40 mm. A window frame 44 is provided on the outer circumference of the window member 42, and the window member 42 is fixed to the window frame 44. An O ring for liquid-tightness is provided between the window member 42 and the window frame 44.

The window frame 44 includes an inner window frame 45 and an outer window frame 46. The window member 42 is fixed by being sandwiched between the inner window frame 45 and the outer window frame 46. The window frame 44 is made of a metallic material such as stainless steel. The inner window frame 45 is positioned between the first end 21 and window member 42 and comes into contact with the water subject to treatment flowing in the dual-pipe structure unit 12. An O ring is provided between the first end 21 and the inner window frame 45. The outer window frame 46 is positioned between the window member 42 and the water-cooled mechanism 50. The window frame 44 is fixed to the first end 21 by means of a fastening member 48 comprised of a bolt and nut, or the like. The fastening member 48 is guided through a mount hole extending through the flange of the first end 21, the inner window frame 45, and the outer window frame 46 and sandwiches and fixes the first end 21, the inner window frame 45, and the outer window frame 46.

The water-cooled mechanism 50 uses cooling water supplied from the water intake port 28 to cool the light emitting device 40. The water-cooled mechanism 50 includes a cooling water supply port 52 and a cooling water discharge port 54. The cooling water supply port 52 is connected to the water intake port 28 via a cooling water supply pipe 56, and a portion of the water subject to treatment flowing in the dual-pipe structure unit 12 is supplied to the cooling water supply port 52 as cooling water. The water-cooled mechanism 50 includes a heat sink (not shown) thermally coupled to the light emitting device 40 and an internal pipe (not shown) for circulating cooling water thermally coupled to the heat sink. The cooling water flowing through the internal pipe is discharged outside via a cooling water discharge pipe 58 connected to the cooling water discharge port 54. The water-cooled mechanism 50 is attached to the outer window frame 46.

The introduction pipe 16 is a funnel-shaped member and is shaped such that the diameter that grows progressively from an introduction end 61 toward a connection end 62. The introduction pipe 16 is made of a metallic material such as stainless steel. The introduction end 61 and the connection end 62 are provided with a flange that extends radially outward. The connection end 62 is connected to the inflow end 32 of the inner pipe 30. The connection end 62 has the same inner diameter as the inner pipe 30 so that the water subject to treatment flows smoothly from the introduction pipe 16 to the inner pipe 30. A pipe for supplying water subject to treatment is connected to the introduction end 61. The introduction end 61 is configured to have the same inner diameter as the pipe connected thereto. The introduction pipe 16 connects between the pipe and the inner pipe 30, which have different diameters, and straightens the flow of the water subject to treatment flowing from the inflow end 32 into the interior of the inner pipe 30.

The introduction pipe 16 is fixed to the dual-pipe structure unit 12 by means of a fastening member 64. The fastening member 64 is guided through a mounting hole extending through the flange of the second end 22, the inlaid flange 36, the flange of the inflow end 32, and the flange of the connection end 62 and sandwiches and fixes these members. The allows the inlaid flange 36 to restrict the radial position of the inner pipe 30 and prevents the radial displacement of the inner pipe 30.

A description will now be given of the operation of the water treatment device 10 having the above configuration. Water subject to treatment is introduced from the introduction end 61 and flows in the axial direction toward the light source unit 14 via an introduction flow passage 72 in the introduction pipe 16 and an internal flow passage 74 in the inner pipe 30. The light source unit 14 radiates ultraviolet light in the axial direction to irradiate the water subject to treatment flowing in the internal flow passage 74. The water subject to treatment irradiated with ultraviolet light flows out of the inner pipe 30 via the gap 76 between the light source unit 14 and the opposing end 31 and flows out from the outflow port 26 via an external flow passage 78 between the outer pipe 20 and the inner pipe 30. A portion of the water subject to treatment is supplied from the water intake port 28 to the water-cooled mechanism 50 via the cooling water supply pipe 56 and is used to cool the plurality of light emitting devices 40. The cooling water used is discharged outside from the cooling water discharge port 54.

The water treatment method using the water treatment device 10 includes irradiating water subject to treatment that flows in from the inflow end 32 and flows in the inner pipe 30 in the axial direction with ultraviolet light and causing the water subject to treatment irradiated with ultraviolet light to flow out from the outflow port 26. In this process, the water subject to treatment is supplied such that the pressure loss occurring when the water passes through the water treatment device 10 is not less than 5 kPa and not more than 20 kPa. By supplying water subject to treatment such that the pressure loss is within such a range, the flow of the water subject to treatment in the water treatment device 10 is straightened, and the water subject to treatment as a whole is uniformly irradiated with ultraviolet light.

A description will be given of the advantage achieved by the embodiment. According to the embodiment, the water subject to treatment flowing in the inner pipe 30 is irradiated with ultraviolet light along the flow direction so that the water subject to treatment is affected by ultraviolet light over a period of time in which the water flows in the axial direction. Provided that ultraviolet light is radiated in a direction perpendicular to the flow direction, the water can be affected by ultraviolet light for only a small period of time in which the water passes in the ultraviolet radiation range. In this case, it is necessary to secure a long ultraviolet irradiation range by, for example, arranging light sources in the flow direction so as to enhance the action. Meanwhile, it is ensured that the action takes place over a long distance merely by providing the light source unit 14 at a position facing the flow direction. Thus, according to the embodiment, the ultraviolet light from the light source provided at the end of the flow passage is caused to affect the water subject to treatment efficiently.

According to the embodiment, the outer circumferential surface 23 and the inner circumferential surface 24 of the inner pipe 30 are prevented from being stained by using a fluororesin such as PTFE as a material of the inner pipe 30. Further, PTFE is a material having a high ultraviolet reflectivity so that the ultraviolet light from the light source unit 14 is propagated in the axial direction by reflecting it on the inner circumferential surface 24. This increases the amount of ultraviolet light affecting the water subject to treatment as compared with the case of using a material having a low ultraviolet reflectivity to form the inner pipe 30. Consequently, the water treatment performance is improved.

According to the embodiment, the water subject to treatment is caused to flow out of the inner pipe 30 via the gap 76 provided over the entirety of the opposing end 31 so that the flow of the water subject to treatment as a whole is uniformized. Provided that the flow passage to cause the water to flow out of the inner pipe 30 is provided only in a portion in the circumferential direction or provided asymmetrically in the circumferential direction, the asymmetricity of the flow passage structure induces a disturbance in the flow of the water subject to treatment, which could result in a deviation in the flow rate distribution. The action of ultraviolet light is related to the time in which the water subject to treatment flows in the inner pipe 30, i.e., the flow rate. Therefore, a deviation created in the flow passage distribution results in a localized shortage of the irradiation level. According to the embodiment, the flow rate distribution is uniformized so that the ultraviolet irradiation level is also uniformized. This allows the entirety of the water subject to treatment to be sufficiently sterilized.

According to the embodiment, the aforementioned straightening effect is suitably obtained by sizing the gap 76 between the light source unit 14 and the opposing end 31 to be not less than 3 mm and not more than 30 mm. By providing the outflow port 26 at a position in a range of not less than 10 mm and not more than 100 mm from the first end 21 in the axial direction, the pressure loss in the water treatment device 10 is uniformized. Similarly, by providing the water intake port 28 at a position radially opposite to the outflow port 26, the symmetry of the flow passage structure is enhanced and the pressure loss is conditioned to be even more uniform.

According to the embodiment, the displacement of the inner pipe 30 is suitably prevented by providing a prevention member such as the inlaid flange 36 and the lock pin 38. If the volume of flow of the water subject to treatment is large, the inner pipe 30 may be vibrated due to the fluid energy from the inflow of the water subject to treatment, and the gap between the outer pipe 20 and the inner pipe 30, i.e., the flow passage width of the external flow passage 78 might vary. Variation in the flow passage width of the external flow passage 78 might result in nonuniform pressure loss and reduction in the treatment performance. According to the embodiment, the prevention member prevents the vibration of the inner pipe 30 and maintains the flow passage width of the external flow passage 78 constant so that the pressure loss is maintained constant.

Described above is an explanation based on an exemplary embodiment. The embodiment is intended to be illustrative only and it will be understood by those skilled in the art that various design changes are possible and various modifications are possible and that such modifications are also within the scope of the present invention.

It should be understood that the invention is not limited to the above-described embodiment but may be modified into various forms on the basis of the spirit of the invention. Additionally, the modifications are included in the scope of the invention.

What is claimed is:

1. A water treatment device comprising:
    a dual-pipe structure unit including an outer pipe extending in an axial direction from a first end to a second end, an inner pipe provided in the outer pipe and extending in the axial direction, and a prevention member provided between the outer pipe and the inner pipe and preventing displacement of the inner pipe in a radial direction relative to the outer pipe; and
    a light source unit provided to block an opening of the first end of the outer pipe in a liquid-tight manner and radiating ultraviolet light in the axial direction to irradiate water subject to treatment flowing in the inner pipe,
    wherein the inner pipe includes an opposing end facing the light source unit across a gap provided between the opposing end and the light source unit, and an inflow end positioned opposite to the opposing end, the water subject to treatment flowing in through the inflow end, and
    the outer pipe includes an outflow port provided on an outer circumferential surface of the outer pipe, and the water subject to treatment flowing out of the inner pipe via the gap flows out from the outflow port, and
    the prevention member includes an inlaid flange provided to block a space between the second end of the outer pipe and the inflow end of the inner pipe, and the inlaid flange is sandwiched and fixed between a flange of the second end and a flange of the inflow end.

2. The water treatment device according to claim 1, wherein
    a dimension of the gap in the axial direction is not less than 3 mm and not more than 30 mm.

3. The water treatment device according to claim 1, wherein
    a difference between an inner diameter of the outer pipe and an outer diameter of the inner pipe is not less than 10 mm and not more than 50 mm.

4. The water treatment device according to claim 1, wherein
    the outflow port is provided at a position closer to the second end than the first end.

5. The water treatment device according to claim 1, wherein
    the light source unit includes a light emitting device for emitting ultraviolet light and a water-cooled mechanism for cooling the light emitting device, and the water-cooled mechanism is configured to be supplied with cooling water from a water intake port provided on the outer circumferential surface of the outer pipe, and
    the water intake port is provided at a position radially opposite to the outflow port, sandwiching the inner pipe.

6. A water treatment device comprising:
    a dual-pipe structure unit including an outer pipe extending in an axial direction from a first end to a second end, an inner pipe provided in the outer pipe and extending in the axial direction, and a prevention member provided between the outer pipe and the inner pipe and preventing displacement of the inner pipe in a radial direction relative to the outer pipe; and
    a light source unit provided to block an opening of the first end of the outer pipe in a liquid-tight manner and radiating ultraviolet light in the axial direction to irradiate water subject to treatment flowing in the inner pipe, wherein the inner pipe includes an opposing end facing the light source unit across a gap provided between the opposing end and the light source unit, and an inflow end positioned opposite to the opposing end, the water subject to treatment flowing in through the inflow end and the outer pipe includes an outflow port provided on an outer circumferential surface of the outer pipe, and the water subject to treatment flowing out of the inner pipe via the gap flows out from the outflow port, and the prevention member includes an inlaid flange provided to block a space between the second end of the outer pipe and the inflow end of the inner pipe, and the inlaid flange is formed so as to be integrated with the inflow end as a step in contact with an inner circumferential surface of the outer pipe.

7. The water treatment device according to claim 6, wherein
a dimension of the gap in the axial direction is not less than 3 mm and not more than 30 mm.

8. The water treatment device according to claim 6, wherein
a difference between an inner diameter of the outer pipe and an outer diameter of the inner pipe is not less than 10 mm and not more than 50 mm.

9. The water treatment device according to claim 6, wherein
the outflow port is provided at a position closer to the second end than the first end.

10. The water treatment device according to claim 6, wherein
the light source unit includes a light emitting device for emitting ultraviolet light and a water-cooled mechanism for cooling the light emitting device, and the water-cooled mechanism is configured to be supplied with cooling water from a water intake port provided on the outer circumferential surface of the outer pipe, and
the water intake port is provided at a position radially opposite to the outflow port, sandwiching the inner pipe.

11. A water treatment device comprising:
a dual-pipe structure unit including an outer pipe extending in an axial direction from a first end to a second end, an inner pipe provided in the outer pipe and extending in the axial direction, and a prevention member provided between the outer pipe and the inner pipe and preventing displacement of the inner pipe in a radial direction relative to the outer pipe; and a light source unit provided to block an opening of the first end of the outer pipe in a liquid-tight manner and radiating ultraviolet light in the axial direction to irradiate water subject to treatment flowing in the inner pipe, wherein the inner pipe includes an opposing end facing the light source unit across a gap provided between the opposing end and the light source unit, and an inflow end positioned opposite to the opposing end, the water subject to treatment flowing in through the inflow end, and the outer pipe includes an outflow port provided on an outer circumferential surface of the outer pipe, and the water subject to treatment flowing out of the inner pipe via the gap flows out from the outflow port, and the prevention member includes a plurality of lock pins extending in a radial direction from an inner circumferential surface of the outer pipe toward an outer circumferential surface of the inner pipe at a position closer to the first end than the second end, and the plurality of lock pins are arranged at equal intervals in a circumferential direction.

12. The water treatment device according to claim 11, wherein
a dimension of the gap in the axial direction is not less than 3 mm and not more than 30 mm.

13. The water treatment device according to claim 11, wherein
a difference between an inner diameter of the outer pipe and an outer diameter of the inner pipe is not less than 10 mm and not more than 50 mm.

14. The water treatment device according to claim 11 wherein
the outflow port is provided at a position closer to the second end than the first end.

15. The water treatment device according to claim 11, wherein
the light source unit includes a light emitting device for emitting ultraviolet light and a water-cooled mechanism for cooling the light emitting device, and the water-cooled mechanism is configured to be supplied with cooling water from a water intake port provided on the outer circumferential surface of the outer pipe, and
the water intake port is provided at a position radially opposite to the outflow port, sandwiching the inner pipe.

* * * * *